United States Patent
Benavidez

Patent Number: 6,014,833
Date of Patent: Jan. 18, 2000

[54] FLOATING FISHERMAN'S ACCESSORY

[76] Inventor: Gabriel M. Benavidez, 7300 Arcturas Dr., Sarasota, Fla. 34243

[21] Appl. No.: 09/115,864

[22] Filed: Jul. 15, 1998

[51] Int. Cl.⁷ .......................... A01K 97/05; A01K 97/06
[52] U.S. Cl. .......................... 43/54.1; 43/55; 206/315.11; 220/560; 280/28.12
[58] Field of Search .............................. 43/54.1, 55, 56; 441/129–131; 206/315.11; 220/560, 505, 915.2, 375; 224/920, 153; 280/7.1, 7.12, 845, 15, 28.12, 28.17

[56] References Cited

U.S. PATENT DOCUMENTS

| | | | |
|---|---|---|---|
| 307,375 | 10/1884 | Busche | 43/56 |
| 1,809,696 | 6/1931 | Heilweil | 220/375 |
| 2,634,541 | 4/1953 | Adams | 220/375 |
| 3,030,122 | 4/1962 | Madera | 280/28.12 |
| 3,045,262 | 7/1962 | Mitchell | 43/55 |
| 3,158,299 | 11/1964 | Weir et al. | 224/153 |
| 3,304,645 | 2/1967 | Hardesty et al. | 43/55 |
| 3,324,488 | 6/1967 | Schulz, Jr. | 441/131 |
| 3,357,127 | 12/1967 | Barradale | 43/55 |
| 3,367,061 | 2/1968 | Brandemihl et al. | 43/55 |
| 3,477,165 | 11/1969 | Brancato | 43/55 |
| 3,490,169 | 1/1970 | Tweed | 206/315.11 |
| 3,678,611 | 7/1972 | Files | 43/54.1 |
| 3,877,144 | 4/1975 | LeBlanc | 43/54.1 |
| 4,271,549 | 6/1981 | Chandler | 441/130 |
| 4,271,624 | 6/1981 | Peluso | 43/54.1 |
| 4,297,804 | 11/1981 | Weld | 43/55 |
| 4,638,593 | 1/1987 | Garcia | 43/54.1 |
| 4,671,008 | 6/1987 | Lindemood | 43/54.1 |
| 4,730,569 | 3/1988 | Colson | 280/28.12 |
| 4,794,723 | 1/1989 | Arnold et al. | 43/55 |
| 4,829,699 | 5/1989 | Perkins | 43/57.1 |
| 4,841,661 | 6/1989 | Moore | 43/54.1 |
| 4,871,079 | 10/1989 | Doucette et al. | 220/560 |
| 4,878,311 | 11/1989 | Cano | 43/54.1 |
| 4,887,716 | 12/1989 | Abraham | 220/560 |
| 4,905,404 | 3/1990 | Pasion et al. | 43/55 |
| 4,927,041 | 5/1990 | Hepburn | 220/560 |
| 4,996,790 | 3/1991 | Ruggles | 43/55 |
| 5,163,694 | 11/1992 | Reichek | 441/129 |
| 5,251,921 | 10/1993 | Daniels | 280/28.12 |
| 5,402,596 | 4/1995 | Gillming, Jr. | 43/54.1 |
| 5,551,186 | 9/1996 | Harada | 43/55 |
| 5,575,490 | 11/1996 | Simpson, Jr. | 280/28.12 |
| 5,593,061 | 1/1997 | Prochnow | 220/507 |
| 5,597,277 | 1/1997 | Mayfield | 441/130 |
| 5,791,479 | 8/1998 | Beres | 206/315.11 |

Primary Examiner—Michael J. Carone
Assistant Examiner—Darren W. Ark
Attorney, Agent, or Firm—Joseph N. Breaux

[57] ABSTRACT

A Floating Fisherman's Accessory which is fabricated of Styrofoam™ measuring approximately 3 feet in length, 4 inches in height and 18 inches in width which includes several openings which extend into the water including a large opening for placement of the 5 gallon bucket, two sealed storage areas, one for storing cold drinks, and one for storing fishing equipment and tackle, a pair of metal skids runs along a bottom length on each side of the device allowing the device to be pulled across terrain without damaging the live bait bucket, the device also includes accessory drink holders and fishing pole holders.

3 Claims, 1 Drawing Sheet

FLOATING FISHERMAN'S ACCESSORY

TECHNICAL FIELD

The present invention relates to devices and methods for wade fishing and more particularly to devices and methods for a floating fisherman's accessory which is constructed of Styrofoam™ with several deep openings for bait storage, cold drinks, fishing tackle, and other accessories, furthermore the device includes a pair of metal skids which run along the length of the bottom on each side of the device allowing a fisherman to drag the device over terrain if necessary.

BACKGROUND ART

The sport of wade fishing has become very popular with fisherman who reside along the shallow coastal waterways and barrier islands of the Atlantic and Gulf coast. A wade fisherman typically walks long distances on a given outing and sometimes several miles. The object of the wade fisherman is to walk throughout a shallow body of water while continuously casting bait. While fishing the fisherman constantly requires fresh bait, fishing tackle repairs, drinks, a location for storing caught fish, and preferably a location for storing tools and the like. Typically a wade fisherman will drag a live bait holder with a floating donut shape ring around its top edge. The wade fisherman would then have to carry fishing tackle, tools, and other useful items in either a backpack, fannypack, or his pockets. The present invention overcomes the problem with carrying the necessary items for wade fishing be providing a device which allows the fisherman to carry all necessary items for wade fishing.

Several patents have attempted to overcome the problems associated with carrying necessary items for wade fishing, as follows:

Prothnow, U.S. Pat. No. 5,593,061 which discloses a fishing tackle storage and carrying apparatus.

Gillming, Jr., U.S. Pat. No. 5,402,596 discloses a floating holder for wade fisherman's accessories.

Ruggles, U.S. Pat. No. 4,996,790 which discloses a floating bait bucket.

Hepburn, U.S. Pat. No. 4,927,041 which discloses a self stabilizing floating cooler.

Pasion, et al, U.S. Pat. No. 4,905,404 which discloses a floating fish basket.

Cano, U.S. Pat. No. 4,878,311 which discloses a buoyant fishing container.

Perkins, U.S Pat. No. 4,829,699 which discloses a lure tangle free floating tackle box.

Arnold, et al, U.S. Pat. No. 4,794,723 which discloses a floating bait bucket.

Garcia, U.S. Pat. No. 4,638,593 which discloses a floating fishing accessory. As can be seen from the prior art there are various types of floating fisherman accessories for supporting bait, tackle, etc. adjacent to the fisherman while wading in the water. However, prior to the present invention there has been no device which discloses a fisherman's accessory with the numerous useful components as the present invention.

GENERAL SUMMARY DISCUSSION OF INVENTION

It is thus an object of the invention to provide a Floating Fisherman's Accessory that provides a wading fisherman with a convenient all in one floating system which would hold bait, a tackle box, fishing equipment, tools, drinks, a fish stringer, a fish length ruler, and metal skids allowing the device to be dragged across terrain if necessary.

It is a still further object of the invention to provide a Floating Fisherman's Accessory that provides a device for floating and retaining a 5 gallon live bait bucket while wade fishing.

It is a still further object of the invention to provide a Floating Fisherman's Accessory that includes a cooling location for storing drinks for ready access by the fisherman during the day.

It is a still further object of the invention to provide a Floating Fisherman's Accessory that includes a storage location for storing fishing tackle and other fishing equipment.

It is a still further object of the invention to provide a Floating Fisherman's Accessory that includes individual openings for placement of cups or drinks while fishing.

It is a still further object of the invention to provide a Floating Fisherman's Accessory that includes a pair of metal skids which run along the length bottom sides of the device which allows the device to be dragged across terrain without damaging the underside of the device or the 5 gallon live bait bucket which extends through a bottom portion of the device.

It is a still further object of the invention to provide a fishing accessory with a 30 inch fish ruler located on one side face of the device allowing the fisherman to quickly measure fish caught to check for legality.

It is a further object of the invention to provide a Floating Fisherman's Accessory that is fabricated of floating material such as Styrofoam, and would measure approximately 36 inches in length, 4 inches in height, and 18 inches in width with several deep openings which would extend into the water while in use while the center of the device includes a large opening or hole for placement of a five gallon live bait bucket which would extend into the water when the device is floating, a storage box would be located on a front portion of the device which would serve to hold fishing tackle with separated slots for storage of fishing hooks and fishing tackle gear, while the opposite end of the device would house a 4 inch deep recessed area which would provide a cooling location for storing can drinks, one side of the device would feature two individual openings for placement of cups or drinks while fishing, two removable lids each provided for the drink holding container and the storage bin, each lid would be detached and tethered with an individual line attached to the device, a drag line would be attached to the device for attachment to a user's belt line for pulling the device through water and/or over terrain, a pair of metal skids would run along the length of the bottom of each side allowing the device to be pulled over terrain without damaging the device or the 5 gallon bait bucket extending through a bottom portion of the device, and a 30 inch ruler would be incorporated into one side face of the unit allowing the user to conveniently measure any fish caught and further wherein a retractable fish stringer line would be attached to a portion of the device allowing the user to keep his fish fresh in the cool water until through fishing for the day.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
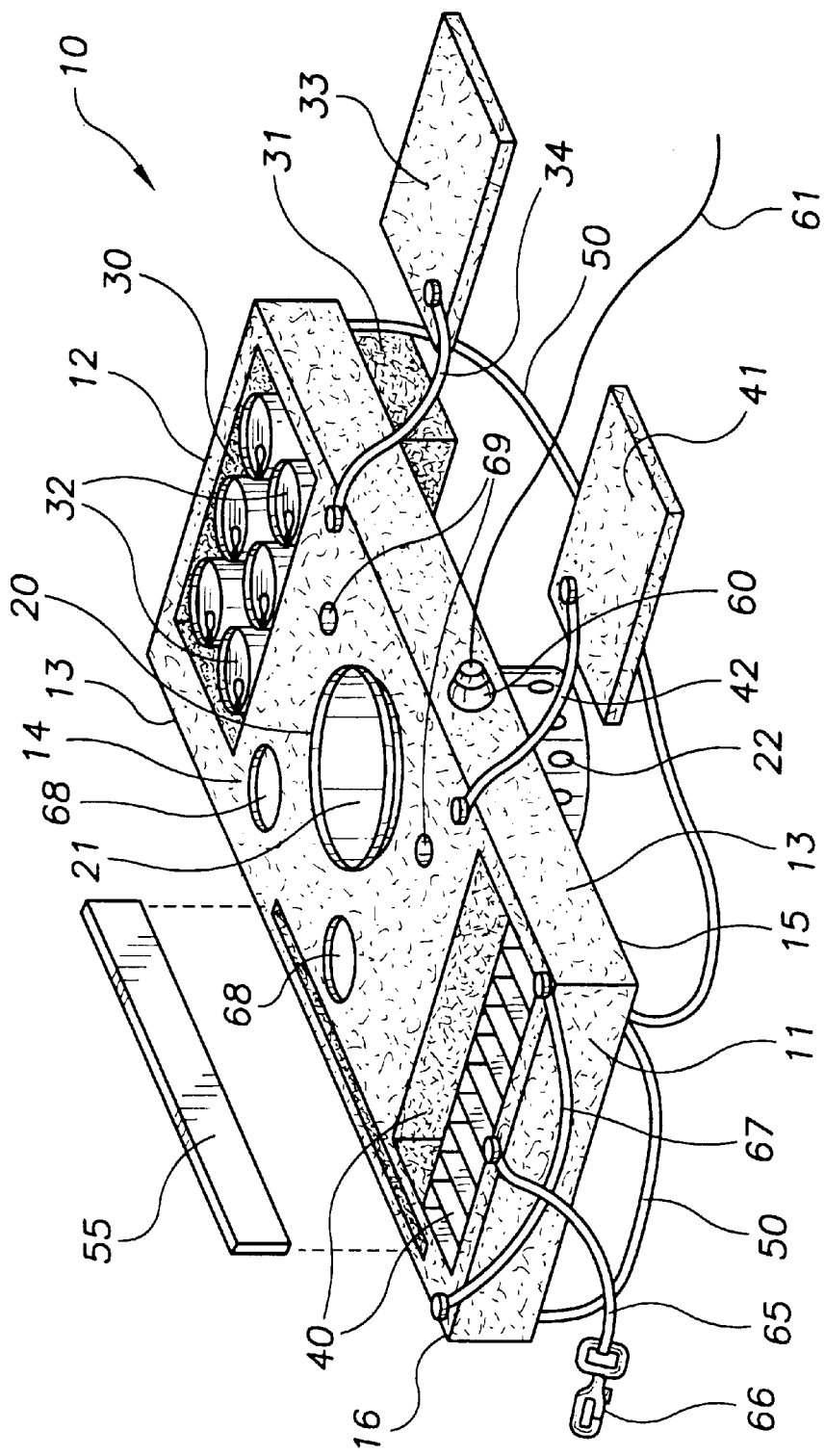
FIG. 1 is an isometric view of the Floating Fisherman's Accessory illustrating the components of the device.

It can be seen from the following description that in use, a wading fisherman would bring the floating fisherman's accessory along with him while fishing. The fisherman would place bait and tackle into the storage container for each. The fisherman would place live bait within a 5 gallon bait bucket located within a central portion of the device which allows the 5 gallon live bait bucket to extend into the water when the device is floating on the water. The user would then place beverages, i.e., a six pack of drinks into the beverage holding container. The user could then place ice over the drinks if desired. The device includes lids for the cooling location and the equipment storage location. Once the fisherman's accessories are loaded the user could if desired simply attach the tow rope from the device with a clip to the user's belt or belt line. The user simply pulls the unit behind him as he walks to the fishing location utilizing the devices metal skids. This would free the hands of the user allowing him to cast as he walks in the shallows of the body of water. As the user wades into deeper water the device would float with the aerated live bait bucket extending into the water. While in use the user may place a drink into one of the cup holders located on a top portion of the device. When and if a fish is caught it would be measured by use of the built in 30 inch ruler on the side face of the device to determine the legality of the catch. The retractable stringer would then be utilized to attach the fish to the device for safe keeping until the fishing outing is over. As will be described herein the Floating Fisherman's Accessory would provide wading fisherman with a floating, all in one, fishing accessory which will allow him to bring all of the necessities while fishing.

Referring to the drawing in detail, the fisherman's accessory includes a foam body member 10 which is fabricated from floating material such as Styrofoam™, closed cell polyurethane foam, or any other suitable floating foam material. The foam body member 10 is substantially rectangular in dimension and preferably about 36 inches in length, 18 inches in width, and four inches deep. The body member 10 includes a front end 11, rear end 12, side faces 13, top surface 14 and bottom surface 15. The device outer surface is preferably coated with a polymeric coating system which adheres to the foam from which the device is constructed and prevents deterioration of the foam surface from sunlight, abrasion, and other chemical and physical elements which may wear on the device's foam outer surface.

The device includes a central aperture 20 which extends through the device middle portion and which aperture 20 has a diameter dimensioned to allow a 5 gallon live bait bucket to be placed within the aperture while the bait bucket top rim catches the top surface 14 of the device thereby preventing the bait bucket from falling all the way through the aperture 20. The bait bucket 21 preferably includes numerous small holes 22 for allowing water to flow through the bait bucket 21 when the device is floating in water, thereby providing a means for maintaining live bait.

A beverage cooling container 30 is located on the rear end 12 of the device. The beverage container 30 is preferably rectangular in shape and dimensioned to allow a six pack of can drinks to be inserted into the container while an extending portion of the container 31 extends below the bottom surface 15 of the device. Can drinks 32 are inserted into the cooling container 30 while ice is added to the container after the drinks have been inserted into the container 30. A cooling container lid 33 is attached to a top portion of the cooling container 30. The cooling container lid 33 is tethered to the device with a tether line 34 which prevents the lid 33 from inadvertently blowing off and being misplaced.

Fishing tackle storage container 40 is located on a front end 11 of the device end. The fishing tackle storage container 40 includes numerous bins and storage locations for storing fishing hooks, lures, and tackle including tools necessary for repairing fishing tackle if desired. Fishing tackle storage container lid 41 is provided for maintaining a lid on the storage container 40. The storage lid 41 is tethered to the device utilizing tether line 42.

Two metal skids 50 extend the length of the device and are attached near the outside edges of the bottom 15 of the device. The metal skids 50 also extend a distance from the bottom surface 15 of the device so the device is held above the terrain surface sufficiently to prevent the five gallon bait bucket from dragging the terrain. The metal skids 50 allow the device to be dragged either over terrain or through shallow water without damaging the bottom surface of the device and further preventing damage to the live bait bucket. The metal skids are preferably constructed of tubular members of about ½ inch to about 1 inch in diameter.

Fish length measuring ruler 55 is attached to one outer face 13 of the device. The ruler allows a fisherman to quickly measure the length of fish and to check for legality of the fish.

Retractable fish stringer 60 which includes a retractable stringer line 61 is attached to a side face 13 of the device. The stringer 60 allows the fisherman to attach the fish to the device providing a convenient location for storing the fish during the fishing outing. The retractable stringer also provides a means for assuring that the fish remain fresh throughout the fishing day.

Tow line 65 is attached to a top surface front edge 16 of the device. The tow line 65 is preferably about fifteen to about twenty feet in length and includes a hook 66 for hooking around a belt loop or waist of a user. Drag loop 67 is a looped line attached to the top surface front edge 16 of the device from outside face to outside face 13. The drag line 67 provides a convenient location for the user to grab the device while the device is floating near the fisherman. The looped line 67 and tow line 65 are attached to the foam device utilizing PVC inserts which prevent line abrasion and chaffing on the foam. Other lines which attach to the foam device are preferably attached with anti-chaffing means such as a PVC insert for the line. Drink accessory inserts 68 are located on a top surface of the device and provide a location for placing drinks during the fishing day. Fishing pole inserts 69 are also provided on a top surface of the device allowing a fisherman to insert a fishing pole handle if desired or providing a location for storing an extra fishing pole if necessary.

It is noted that the embodiment of the Floating Fisherman's Accessory described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A floating fisherman's accessory comprising:

a) a foam body member which is rectangular in shape and about thirty six inches long, about four inches tall, about eighteen inches wide, and further includes a top surface, a bottom surface, a front end and a rear end, b) a central aperture extending through a central portion of the foam body member and dimensioned to receive a five gallon live bait bucket and further dimensioned so that the five gallon bait bucket with a top edge rim will not fall through the aperture, c) a drink storage container located on a rear end portion of the foam body member, wherein the drink storage container is rectangular in dimensions and extends deep enough into the foam body member so that a twelve ounce drink can be inserted into the storage container, the drink storage container further including a lid which is tetheredly attached to the foam body member, d) a fishing tackle storage container located on a front end portion of the foam body member and further including numerous bins and storage locations for fishing hooks, lures and tools, the fishing tackle storage container further including a lid which is tetheredly attached to the foam body member, e) a fish length ruler attached to a side edge of the rectangular foam body member providing a means for measuring the length of fish, f) a retractable fish stringer attached to a side edge of the rectangular foam body member providing a means for securing fish to the floating fisherman's accessory, g) a pair of metal skids attached to the bottom surface and extending the length of the foam body member with each skid located near an edge of the foam body member, further wherein said skids extend from the bottom surface a distance which does not allow the five gallon bait bucket to drag terrain when the fishing accessory is dragged across terrain, h) a tow line attached to a front top edge of the foam body member with a hook attachment attached to an end of the tow line, the tow line providing a means for dragging the floating fisherman's accessory across terrain or water while the hook attachment provides a means for attaching the tow line to a belt loop or waist line of a user, I) a drag loop line attached to the front top edge of the foam body member and extending along the front top edge of the foam body member wherein the loop line provides a means for the user to easily grab the floating fisherman's accessory, j) a pair of drink holding apertures located on the top surface of the foam body member which provide locations for storing drinks, and k) a pair of fishing pole apertures located on the top surface of the foam body member which provide locations for storing fishing poles on the floating fisherman's accessory.

2. The floating fisherman's accessory of claim 1, wherein the foam body member further comprises the foam body member being coated with a polymeric coating which reduces photodegradation and physical damage to the foam comprising the foam body member.

3. The floating fisherman's accessory of claim 1, wherein the drag loop line and the tow line further comprise: connecting the lines on the foam body member with polyvinyl chloride inserts which reduce chaffing between the lines and points of attachment on the foam body member.

* * * * *